United States Patent
Foster et al.

(10) Patent No.: US 7,143,060 B2
(45) Date of Patent: Nov. 28, 2006

(54) TRADING PARTY PROFILES IN SYSTEM FOR FACILITATING TRADE PROCESSING AND TRADE MANAGEMENT

(75) Inventors: Gary S. Foster, Arlington, MA (US); Matthew Snow, Boston, MA (US); Chris Stys, Stoneham, MA (US); Jeffrey C. Addis, Marblehead, MA (US); Andy Luro, Princeton, MA (US)

(73) Assignee: Omgeo LLC, Boston, MA (US)

( * ) Notice: Subject to any disclaimer, the term of this patent is extended or adjusted under 35 U.S.C. 154(b) by 786 days.

(21) Appl. No.: 09/930,918

(22) Filed: Aug. 16, 2001

(65) Prior Publication Data

US 2002/0016761 A1 Feb. 7, 2002

Related U.S. Application Data

(63) Continuation-in-part of application No. 09/504,803, filed on Feb. 16, 2000.

(51) Int. Cl.
*G06F 17/60* (2006.01)
(52) U.S. Cl. .............................. 705/35; 705/37; 705/30; 705/34; 705/39; 235/379
(58) Field of Classification Search ................. 705/35, 705/37, 34, 30, 39; 235/379
See application file for complete search history.

(56) References Cited

U.S. PATENT DOCUMENTS

| | | | |
|---|---|---|---|
| 4,346,442 A | 8/1982 | Musmanno | |
| 4,376,978 A | 3/1983 | Musmanno | |
| 4,571,463 A | 2/1986 | Shefler | |
| 4,674,044 A | 6/1987 | Kalmus et al. | |
| 4,694,397 A | 9/1987 | Grant et al. | |
| 4,774,663 A | 9/1988 | Musmanno et al. | |
| 4,823,265 A | 4/1989 | Nelson | |
| 4,949,248 A | 8/1990 | Caro | |
| 4,980,826 A | 12/1990 | Wagner | |
| 5,101,353 A | 3/1992 | Lupien et al. | |
| 5,136,501 A | 8/1992 | Silverman et al. | |
| 5,220,501 A | 6/1993 | Lawlor et al. | |
| 5,262,942 A | 11/1993 | Earle | |
| 5,285,383 A | 2/1994 | Lindsey et al. | |
| 5,463,555 A * | 10/1995 | Ward et al. | 700/96 |
| 5,497,317 A * | 3/1996 | Hawkins et al. | 705/37 |

(Continued)

FOREIGN PATENT DOCUMENTS

GB    2161003 A    1/1986

(Continued)

*Primary Examiner*—Vincent Millin
*Assistant Examiner*—Daniel Felten
(74) *Attorney, Agent, or Firm*—St. Onge Steward Johnston & Reens LLC (57) ABSTRACT

A system for facilitating the processing and settlement of a securities trade is provided. The system includes a computer which receives trade execution information and trade allocation information indicative of an executed trade by first and second trading parties. The system also includes a database of trading party profiles which are indicative of acceptable trade parameters for each trading party. A matching program compares the trade execution information with the trade allocation information and determines that a match exists if the trade execution information and the trade allocation information correlate within the acceptable trade parameters. The trading party profiles are configurable so that the trading parties can fully control enrichment of the trade information with enrichment data, and set timers to control how long the system searches for a match. Each trading party may have a plurality of profiles, from which the system may select depending upon trade criteria.

33 Claims, 5 Drawing Sheets

U.S. PATENT DOCUMENTS

| | | | |
|---|---|---|---|
| 6,021,397 A * | 2/2000 | Jones et al. | 705/36 |
| 6,029,146 A * | 2/2000 | Hawkins et al. | 705/35 |
| 6,247,000 B1 * | 6/2001 | Hawkins et al. | 705/37 |
| 6,317,728 B1 * | 11/2001 | Kane | 705/37 |
| 6,505,174 B1 * | 1/2003 | Keiser et al. | 705/37 |
| 6,601,044 B1 * | 7/2003 | Wallman | 705/36 |
| 6,615,188 B1 * | 9/2003 | Breen et al. | 705/37 |
| 6,629,081 B1 * | 9/2003 | Cornelius et al. | 705/30 |
| 6,721,748 B1 * | 4/2004 | Knight et al. | 707/10 |
| 6,832,210 B1 * | 12/2004 | Li | 705/36 |

FOREIGN PATENT DOCUMENTS

GB    2210714 A    12/1988

* cited by examiner

TRADING PARTY PROFILES IN SYSTEM FOR FACILITATING TRADE PROCESSING AND TRADE MANAGEMENT

RELATED APPLICATIONS

This application is a continuation-in-part of U.S. patent application No. 09/504,803, filed Feb. 16, 2000.

FIELD OF THE INVENTION

The present invention relates to a system for facilitating the processing and settlement of securities trades, and more particularly, to a system which automates and streamlines the trade management process thereby reducing the time and effort involved in processing securities trades while increasing the reliability of the trade management process and keeping all parties to the trade informed about the status of the trade while it is being processed.

BACKGROUND OF THE INVENTION

A variety of systems have been developed for automating portions of the securities trading industry. For example, British patent publications GB 2 161 003 A and GB 2 210 714 A are directed to systems for distributing, processing and displaying financial information. Similarly, U.S. Pat. No. 4,949,248 discloses a local area network for shared access of information services or shared control of applications, aimed particularly at trading rooms of securities firms. Other systems include U.S. Pat. Nos. 4,346,442, 4,376,978 and 4,774,663 which are directed to systems for operating and maintaining securities brokerage-cash management accounts, and U.S. Pat. Nos. 4,674,044, 4,823,265 and 5,101,353 which disclose electronic trade execution systems.

None of the above prior art systems, however, are directed to improving the speed and accuracy of communication of the instructions for exchanging the purchase money and the security to settle an executed trade. Thus, none of the prior art systems adequately speeds trade settlement which is accomplished, if at all, by a patchwork of faxes, telexes, and telephone calls among the trading parties.

Systems for automating the settlement of securities trades and the delivery of trade confirmations have been developed to remedy many of the deficiencies of the prior art systems discussed above. These systems, commonly known as Electronic Trade Confirmation ("ETC") systems, reduce the number of tasks required to confirm a trade, and automate most of the remaining tasks, which tasks would have to be performed manually if such an ETC system were not used. Thus, the ETC systems currently in use reduce the time and effort required to settle a securities trade, as compared to the traditional laborious manual method of sequentially exchanging messages by telephone or telex. However, these prior art ETC systems still suffer from certain deficiencies of their own.

U.S. Pat. No. 5,497,317 discloses a system which is based on a series of messages flowing back and forth between institutions, brokers and custodians. This prior art system thus automates many of the tasks which has previously required human intervention, and therefore reduces the time required to settle trades, typically to within three days of the trade date, so-called "T+3". However, "T+3" has been viewed in the securities trading industry as a transitionary phase, not as an end goal. It is anticipated that the Securities and Exchange Commission will soon require settlement to occur within one day of the trade date ("T+1") and possibly even on the same day as the trade date ("T+0"). The above described prior art device works well for T+3 settlement, but may be susceptible in its manual embodiments to settlement failures in a T+1 or T+0 regime due to the large number of time consuming human interactions required for each settlement. One of these human interactions is confirmation of the final settlement terms according to information standards which are either arbitrary or known only to the parties.

What is desired, therefore, is a system for facilitating the processing and settlement of securities trades which reduces the time required for settlement, which reduces the amount of information required to be input by the parties for each trade, which reduces the number of human interactions in the settlement process, which permits the parties to define settlement standards to automate and thereby speed trade settlements, which provides the parties to the settlement with value added data, which is more reliably capable of achieving settlement within less than three days of the trade date, which permits all parties to a trade to view the status of the trade in real-time, and which is capable of calculating a trade's net amount with minimum input by the trading parties.

SUMMARY OF THE INVENTION

Accordingly, it is an object of the present invention to provide a system for facilitating the processing and settlement of securities trades which reduces the time required for settlement.

Another object of the present invention is to provide a system for facilitating the processing and settlement of securities trades having the above characteristics and which reduces the amount of information required to be input by the parties by making this information available to the system without requiring user input.

A further object of the present invention is to provide a system for facilitating the processing and settlement of securities trades having the above characteristics and which reduces the number of human interactions in the settlement process.

Yet another object of the present invention is to provide a system for facilitating the processing and settlement of securities trades having the above characteristics and which permits the parties to define settlement standards to automate and thereby speed trade settlements.

Still another object of the present invention is to provide a system for facilitating the processing and settlement of securities trades having the above characteristics and which provides the parties to the settlement with value added data used to logically alert users of pertinent information which could affect the settlement of the securities trade.

Yet a further object of the present invention is to provide a system for facilitating the processing and settlement of securities trades having the above characteristics and which is more reliably capable of achieving settlement within less than three days of the trade date.

Still a further object of the present invention is to provide a system for facilitating the processing and settlement of securities trades having the above characteristics and which permits all parties to a trade to view the status of the trade in real-time.

Yet another object of the present invention is to provide a system for facilitating the processing and settlement of securities trades having the above characteristics and which is capable of calculating a trade's net amount with minimum input by the trading parties.

These and other objects of the present invention are achieved by provision of a system for facilitating the processing and settlement of securities trades. The system includes a computer which receives trade execution information indicative of an executed trade by a first trading party and trade allocation information indicative of an executed trade by a second trading party. The system also includes a database of trading party profiles accessible by the computer, the trading party profiles being indicative of acceptable trade parameters for each trading party. Executing on the computer is a matching program for comparing the trade execution information with the trade allocation information and for determining that a match exists if the trade execution information and the trade allocation information correlate within the acceptable trade parameters supplied in the trading party profiles for the first trading party and the second trading party.

In one preferred embodiment, the first trading party profile comprises an indication of enrichment options for the first trading party and the second trading party profile comprises an indication of enrichment options for the second trading party, and a plurality of enrichment databases having enrichment data stored thereon are provided. Software executing on the computer enriches the trade execution information with enrichment data retrieved from the plurality of enrichment databases in accordance with the enrichment options of the first trading party profile and enriches the trade allocation information with enrichment data retrieved from the plurality of enrichment databases in accordance with the enrichment options of the second trading party profile.

In this embodiment, the system preferably further comprises a set of predefined acceptable trade parameters extracted from the first trading party profile and the second trading profile, and software executing on the computer for comparing the trade execution information with the trade allocation information, and for determining that a match exists if the trade execution information and the trade allocation information correlate within the set of predefined acceptable trade parameters.

The enrichment options of the first trading party profile and the enrichment options of the second trading party profile preferably comprise indications of what enrichment data should be used to enrich the trade execution information and the trade allocation information, and indications of where the enrichment data which should be used to enrich the trade execution information and the trade allocation information is located. The enrichment options of the first trading party profile and the enrichment options of the second trading party profile may preferably be dependent on both the first trading party identification and the second trading party identification, or on the type of trade being executed.

Preferably, the system further comprises software executing on the computer for allowing the first trading party to access, modify and confirm the enrichment options of the first trading party profile and for allowing the second trading party to access, modify and confirm the enrichment options of the second trading party profile. The system also preferably further comprises software executing on the computer for allowing the first trading party and the second trading party to access, modify and confirm the enrichment databases, and/or for allowing parties other than the first trading party and the second trading party to access, modify and confirm the enrichment databases.

In another preferred embodiment, the trade execution information includes a first trading party identification and the trade allocation information includes a second trading party identification, and the computer retrieves from the database the trading party profiles based on these first and second trading party identifications and upon trade criteria. This trade criteria may be extracted from the trade execution information, the trade allocation information, or both the trade execution information and the trade allocation information.

In a third preferred embodiment, at least one of the first trading party profile and the second party profile further comprises an indication for a timer to be set and an indication of a specified time period for the timer. In this embodiment, the system preferably further comprises a set of predefined acceptable trade parameters extracted from the first trading party profile and the second trading profile, software executing on the computer for comparing the trade execution information with the trade allocation information, and for determining that a match exists if the trade execution information and the trade allocation information correlate within the set of predefined acceptable trade parameters, and software executing on the computer for generating and transmitting, if no match is found to exist within the specified time period for the timer, a notification to at least one of the first trading party and the second trading party indicating that no match has been found to exist.

Preferably, the system further comprises software executing on the computer for allowing the first trading party to access, modify and confirm the first trading party profile and for allowing the second trading party to access, modify and confirm the second trading party profile so that the timers can be configured by the parties.

The invention and its particular features and advantages will become more apparent from the following detailed description considered with reference to the accompanying drawings.

DETAILED DESCRIPTION OF THE INVENTION

Figure 1:
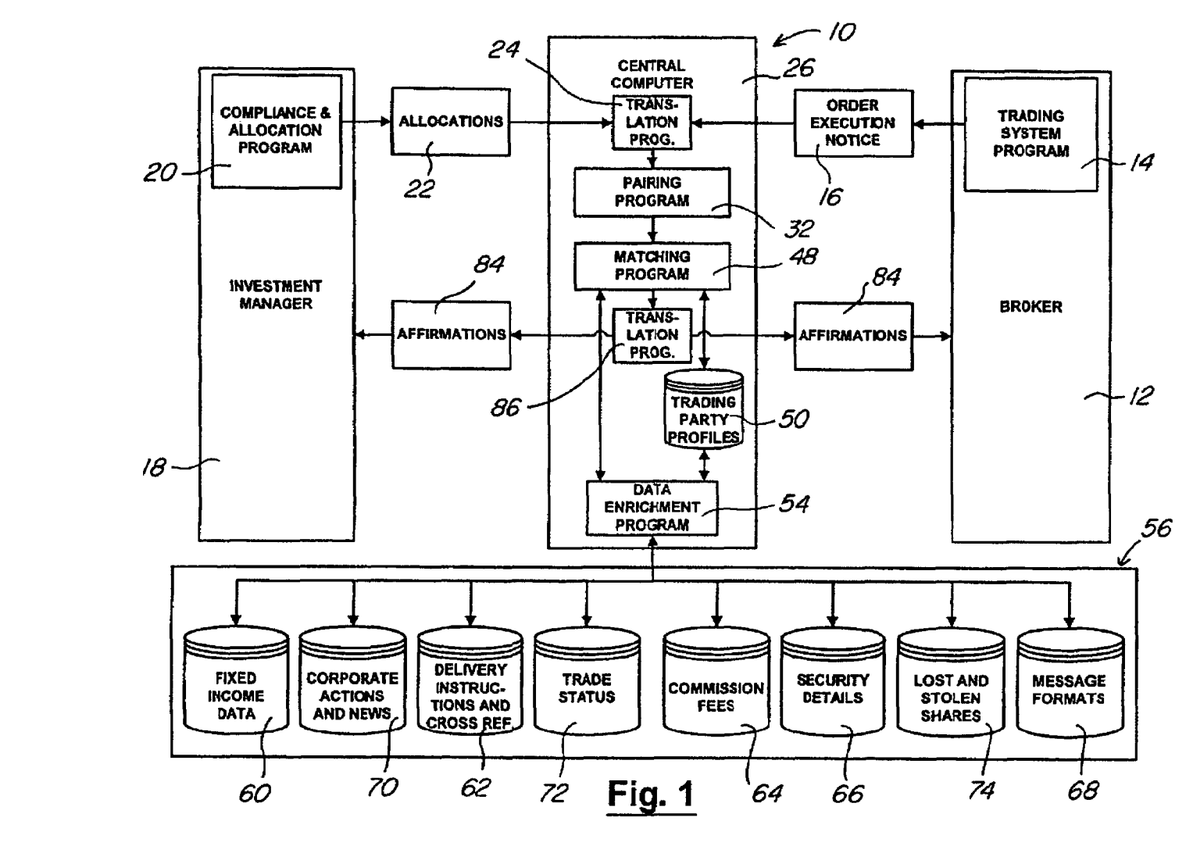
FIG. 1 is a block diagram of a system for facilitating the processing and settlement of securities trades in accordance with the present invention.

Referring first to FIG. 1, a system for facilitating the processing and settlement of securities trades 10 in accordance with the present invention is shown. System 10 receives trade information from two trading parties indicating that a trade has been executed. Typically, one of the trading parties is a broker 12 having a trading system program 14 which supplies trade execution information in the form of an order execution notice 16. The other trading party is typically an investment manager 18 having a compliance and allocation program 20 which supplies trade allocation information in the form of allocations 22. It should be noted, however, that the broker and investment manager situation shown in the Figures and discussed herein is for illustration only, and that the trading parties are not limited to brokers and investment managers. It is envisioned that any individual or institution participating in securities trades may use system 10, so long as two sets of trade information are supplied to the system.

Because there are many trading system programs 14 and compliance and allocation programs 20 which are available, order execution notices 16 and allocations 22 may have any of numerous message formats, (e.g., financial information exchange (FIX), open financial exchange (OFX), etc.) and/or protocols (e.g., systems network architecture (SNA), transmission control protocol/internet protocol (TCP/IP), etc.). For this reason, a translation program 24 executing on the central computer 26 of system 10 is provided. Translation program 24 receives order execution notice 16, extracts trade execution information 28 therefrom, and converts trade execution information 28 into a format which is usable by central computer 26 and the programs executing thereon. Similarly, translation program 24 receives allocations 22, extracts trade allocation information 30 therefrom, and converts trade allocation information 30 into a usable format. Translation program 24 then passes trade execution information 28 and trade allocation information 30 to a pairing program 32 executing on central computer 26. It should be noted that central computer 26 is not limited to a single computer and may comprise a single computer or a system of computers.

Figure 2:
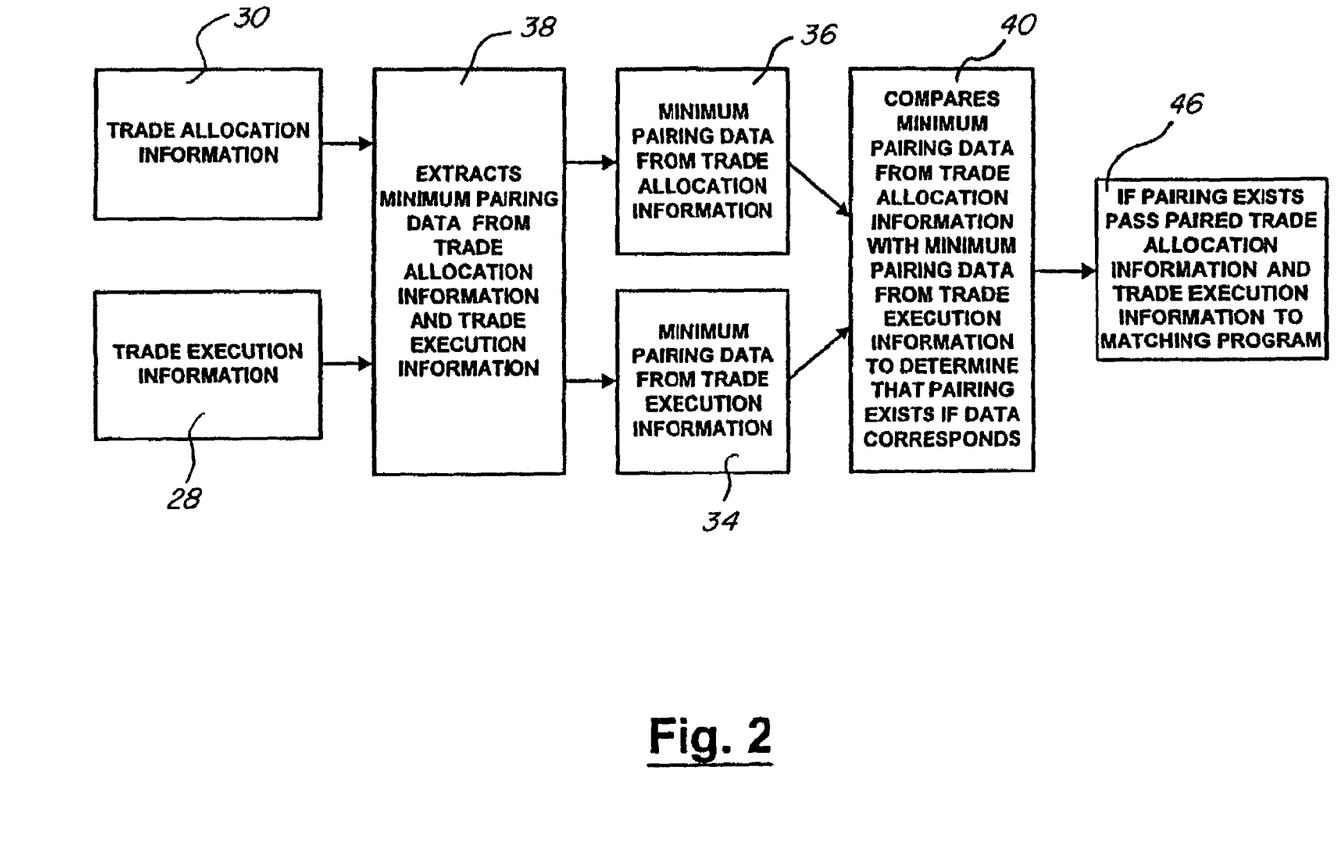
FIG. 2 is a block diagram illustrating the operation of the pairing program of the system for facilitating the processing and settlement of securities trades of FIG. 1.

As best seen in FIG. 2, pairing program 32 receives trade execution information 28 and trade allocation information 30, and extracts from each a set of minimum pairing data 34, 36 (step illustrated as block 38). Minimum pairing data 34, 36 comprise the essential and most basic characteristics of a trade, such as an indicator of whether shares are being bought or sold, the trade date, an identifier of the security, and the number of shares traded. Minimum pairing data 34 from trade execution information 28 and minimum pairing data 36 from trade allocation information 30 are then compared at block 40 and a pairing is found to exist if the minimum pairing data 34, 36 correspond with each other. For example, if trade execution information 28 indicates that 100 shares of IBM were sold on Jan. 1, 1999, and trade allocation information 30 indicates that 100 shares of IBM were bought on Jan. 1, 1999, a pairing would be found to exist. If a pairing is found to exist, paired trade execution information 42 and paired trade allocation information 44 are passed at block 46 to a matching program 48 executing on central computer 26. If a pairing does not occur, system 10 compares trade execution information 28 with other sets of trade allocation information and compares trade allocation information 30 with other sets of trade execution information. If a pairing does not occur after a predetermined time period, the trading party is advised that no pairing has occurred and that the trade has not been settled.

Figure 3:
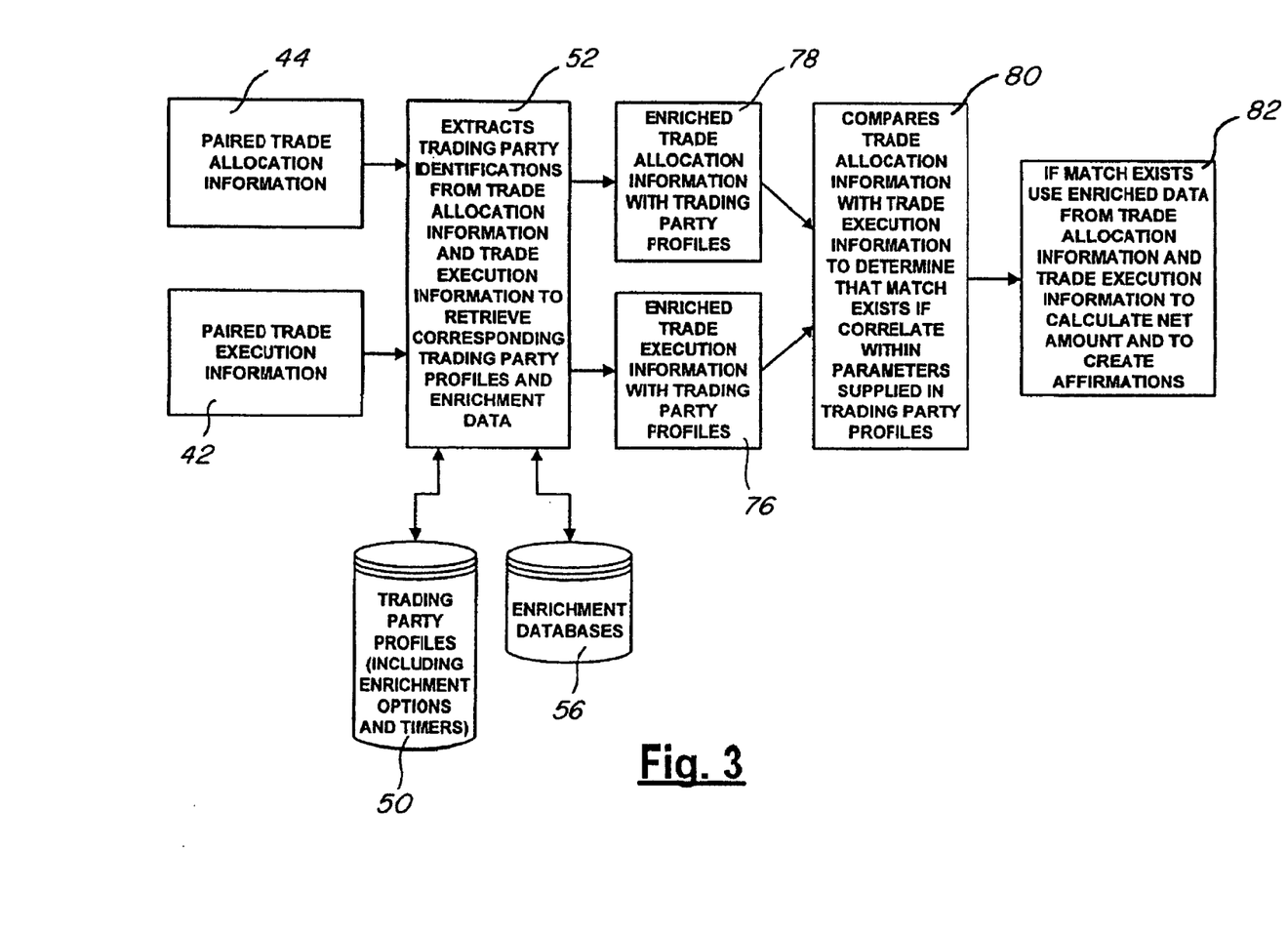
FIG. 3 is a block diagram illustrating the operation of the matching program of the system for facilitating the processing and settlement of securities trades of FIG. 1.

As shown in detail in FIG. 3, paired trade execution information 42 and paired trade allocation information 44 are received by matching program 48. Matching program 48 extracts trading party identifications from paired trade execution information 42 and paired trade allocation information 44, and uses these trading party identifications to query a trading party profiles database 50 to retrieve trading party profiles for each party (step illustrated as block 52). The trading party profiles, which are discussed more fully below, include acceptable trade parameters for each party. The acceptable trade parameters are fully configurable by each trading party for each individual trade and may be based on any of a number of various criteria. Examples of these criteria on which acceptable trade parameters may be specified include, without limitation, counterparty identity, security identity, type of currency, bargain conditions, settlement date, agency, average price, net commission, price, gross consideration, commission amount, commission percentage, commission rate per share, contract gross consideration, commission for the contract, local tax, local fee, other fees, issuing firm charge, net consideration, and accrued interest. The acceptable trade parameters may specify simply whether or not the satisfaction of a criteria is necessary for a match to occur. For example, the trading party may specify that a match can occur only if settlement is to be made in the specific currency identified in its trade execution or trade allocation information. For other criteria which are based on numerical values, the trading party may specify a range, typically expressed either as an absolute value or in a percent tolerance, for which matching will occur. For example, the trading party may specify that for a match to occur, the commission amount must be within plus or minus $100.00 of the commission amount value identified in its trade execution or trade allocation information. Alternately, the trading party may specify that for a match to occur, the commission amount must be within plus or minus 5% of the commission amount value identified in its trade execution or trade allocation information. Of course, the trading party may specify that only a zero tolerance is acceptable, which would require that the criteria correlate exactly for a match to occur. In addition, the trading party may not be concerned about one or more criteria, and may specify that those criteria not be examined to determine if a match exists. It should be noted that preferably, preference is given to the trading party ordering the trade. Therefore, if the data supplied in enriched trade execution information with appended trading party profiles 76 conflicts with the data supplied in enriched trade allocation information with appended trading party profiles 78, the data supplied in enriched trade allocation information with appended trading party profiles 78 would be used. Thus, in the case of a trade between an investment manager and a broker, the preferences of the investment manager would control.

The trading party profiles may be configured to depend on the other party to the paired trade or may be independent of the other trading party. For example, a trading party may configure a first profile having a first set of matching criteria if the other party to the trade is Company A, a second profile having a second set of matching criteria if the other party to the trade is Company B, and a generic default profile having a third set of matching criteria if the other party to the trade is one for which no specific profile has been entered, Company C or Company D for example.

The trading party profiles may be also be configured to depend on information relating to the trade, such as the information found in paired trade execution information 42, paired trade allocation information 44, or both. In such a case, matching program 48 uses this trade information in addition to trading party identifications to query trading party profiles database 50 to retrieve trading party profiles for each party (step illustrated as block 52 in FIG. 3). This allows streamlined access to multiple trading party profiles for each party and selection of the specific trading party profile required based upon attributes of the trade itself.

For illustration purposes, a trade is entered to sell 100 shares of IBM and the broker executing the trade is located in Sydney, Australia. Again, for illustration purposes, the government of Australia imposes a tax equal to 5% of the gross proceeds on all sales of common stocks. Because the "security type" at issue is a common stock, system 10 determines where the trade is taking place, and because it is taking place in Australia, picks a trading party profile which deducts 5% of the gross proceeds, which then allows the trade details to match (see below) with respect to price. It should be noted, however, that the security type and locations of trading parties situation presented herein is for illustration purposes only, and that numerous other criteria may be used in addition to or instead of these criteria.

The ability to manage and access multiple profiles based upon specific criteria or factors expands the flexibility of system 10 and makes it more useful to trading parties, as they can specify the various trade criteria to be taken into account in order for system 10 to select an appropriate trading party profile. Consequently, this ability can help to shorten the settlement cycle because less time needs to be spent dealing with exceptions (discussed below) that would occur if system 10 could not choose profiles specific to variances that are incidental to particular trades.

Also at step 52, matching program 48 queries a data enrichment program 54, which in turn queries a plurality of enrichment databases 56 to retrieve data relevant to the trading parties and to the trade. Enrichment databases 56 may provide information which remains relatively constant from one trade to the next, and which would otherwise have to be entered by the trading parties for numerous trades, such as fixed income data 60, delivery instructions and cross references 62, commission fees 64, security details 66 and message formats 68. Traditionally, such information would have to be entered by the trading parties for each trade through "allocations" and "confirmations." Enrichment databases 56 may also provide information which is related to the trade or the security being traded, and which the trading party may be desirous to know about during or after the trade settlement process, such as corporate actions and news 70, trade status 72 and lost and stolen shares 74. Thus, enrichment databases 56 supplement the information supplied by the trading parties with value added data and reduce the amount of information that must be entered by the trading parties for each trade. It should be understood that enrichment databases 56 may or may not be co-located with central computer 26, and may for example comprise databases maintained by independent organizations and accessed by central computer 26.

To further reduce the time requirement for the processing and settling of securities trades and to further reduce the number of human interactions, the "profiling" aspect of system 10 allows the parties to submit, on a trade by trade basis, the use of different trading models. To this end, the trading party profiles stored on trading party profiles database 50 include indications of enrichment options (see FIG. 3), such as, for example, indications directing data enrichment program 54 as to what enrichment data should be used to enrich a particular trade, and where such enrichment data is sourced. These enrichment options allow different levels of transactional information to be directly input by different parties. Parties can use different enrichment options for different types of trades, or for trades with different parties. In all trading models, outsourcing and enrichment options give multiple data providers access to the enrichment data.

The enriched trade execution information with appended trading party profiles 76 and the enriched trade allocation information with appended trading party profiles 78 are then compared by matching program 48 at block 80 to determine if a match exists. A match will be found to exist if the data supplied in enriched trade execution information with appended trading party profiles 76 correlates with the data supplied in enriched trade allocation information with appended trading party profiles 78 within the parameters supplied with the trading party profiles for each party. An illustrative example follows. Enriched trade execution information with appended trading party profiles 76 indicates that shares of IBM were bought at $1000.00 US with a $100.00 US commission and that matching criteria are security identification and price within 5%. Enriched trade allocation information with appended trading party profiles 78 indicates that shares of IBM were bought at $1010.00 US with a $98.00 US commission and that matching criteria are security identification and commission amount within 5%. A match would occur in this instance because all matching criteria are satisfied. The security identification matches exactly, the two price amounts are within 5% of each other, and the two commission amounts are within 5% of each other.

When a match is found to exist, matching program at block 82 uses enriched trade execution information with appended trading party profiles 76 and enriched trade allocation information with appended trading party profiles 78 to calculate the net amount of the trade. It should be noted that the calculation of the net amount has been accomplished by using information stored on enrichment databases 56, without requiring the manual entry of this information by the parties through, as has traditionally been done, manual entry of "allocations" and "confirmations." Matching program 82 also uses enriched trade execution information with appended trading party profiles 76 and enriched trade allocation information with appended trading party profiles 78 to generate affirmations 84, which include all information necessary to settle the trade and the value added data retrieved from enrichment databases 56. Because trading parties may use many different computer systems, system 10 includes translation program 86 which translates affirmations 84 into a message format and protocol readable by the trading parties. The format and protocol into which affirmations 84 are translated may have been retrieved, for example, from trading party profiles database 50 or from message formats database 68 during data enrichment.

Figure 4:
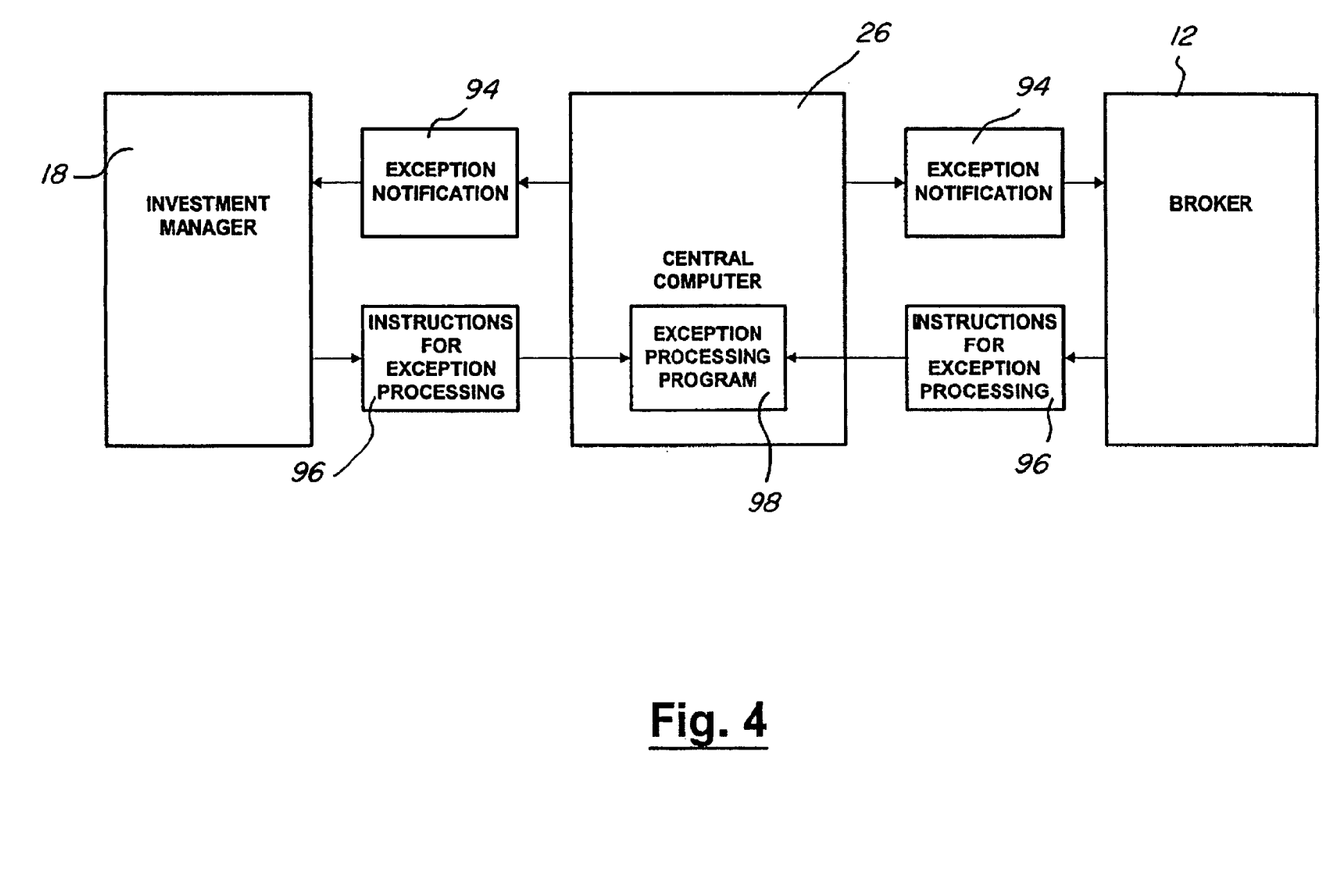
FIG. 4 is a block diagram illustrating of portion of the system for facilitating the processing and settlement of securities trades showing exception processing; and, FIG. 5 is a block diagram of a portion of the system for facilitating the processing and settlement of securities trades of FIG. 1 showing how data management is performed.

Referring now to FIG. 4, if, however, paired trade execution information 42 and paired trade allocation information 44 are found not to match, an exception notification message 94 is generated and transmitted to the trading parties involved. At this point, manual human intervention is required. The trading parties may decide, for example, to reject the trade, to force the match if it was that party's criteria which was not satisfied, or to change some of the information to satisfy the other party's criteria. Instructions for exception processing 96 are the sent by the trading parties to an exception processing program 98 executing on central computer 26. Exception processing program 98 then executes the trading parties' instructions regarding how to process the trade. For example, exception processing program may terminate processing of the trade, continue processing the trade despite the unmatched criteria, of modify paired trade execution information 42 and/or paired trade allocation information 44 to meet the parties' matching criteria and then continue to process the trade, depending on the instructions for exception processing received from the trading parties. It should be understood that this failed match situation is the exception and not the norm, and that in the normal situation where a match occurs, no human intervention is required.

In addition to acceptable trade parameters, the trading party profiles may include additional data relating to each trading party. Such data, which may include information such as data enrichment options (discussed above) and transaction processing rules, relates to the way in which system 10 handles the settlement process. For example, the data enrichment rules may specify which databases are to be accessed for enrichment with value added data, or may specify a database from which to extract information which was not supplied in the trade information for a particular trade. The trade processing rules may relate to the processes system 10 is to take to settle a trade (e.g., use old message based system for a specific trade instead of matching, or accept information supplied by other trading party for specific criteria) or may relate to the way system 10 is to communicate with the trading party (e.g., want affirmations to be sent to multiple locations). Thus, these data enrichment rules and trade processing rules allow trading parties great flexibility in selecting precisely how system 10 functions with respect to each individual trade and allow the trading parties to seamlessly integrate system 10 into their existing systems. Furthermore, enrichment databases 56 and data enrichment rules provide a platform for connecting to databases of pre-agreed upon information and/or information which is standard in the industry.

To further reduce the time required for the processing and settling of securities trades, one specific transaction processing rule which may be incorporated into system 10 relates to the use of "timers". Timers specify how quickly trades or components of trades should be processed as determined by the individual party setting the time, and provide parties with an early warning by identifying instances which may require client intervention or identify exception processing conditions earlier on in the process than would be the case if timers had not been configured and activated.

For example, if a party submits a trade at 8:00 a.m. on a given day and sets a timer for 4 hours to match a trade, and the trade is not matched by noon, the party receives an early warning and can intervene by contacting the counterparty and requesting that it submit the corresponding trade.

In one particular embodiment, timers operate as follows. As part of the trade processing cycle, matching program 48, after retrieving trading party profiles at step 52, checks the retrieved profiles to determine whether or not each trading party has specified that timers for processing components of unmatched trades be set, and sets timers as required. Exception reporting, as described above, takes place if the specified processes are not completed within the limits of the set timers, and if the criteria for exception reporting has been met when the timer expires, then no exception reporting occurs.

As the system receives and processes information, the status and details of the state of the trade is continually monitored and stored on trade status database 72 or in some other form of non-volatile memory. This allows the trading parties to view the status of trades on a real-time basis. This also allows the system to recover the trade related information and continue processing all pending trades in the event of a system failure.

Figure 5:
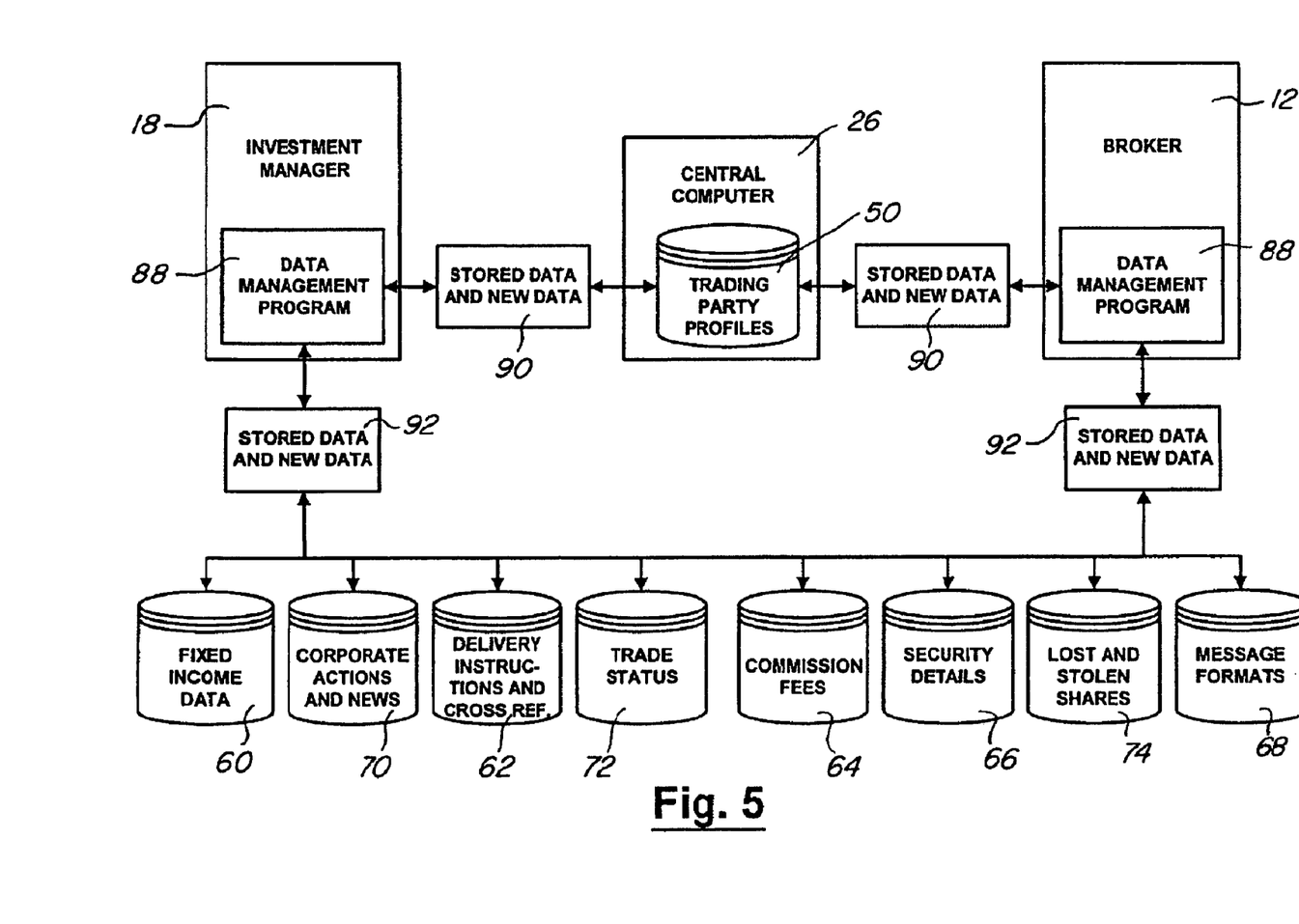

Referring now to FIG. 5, investment manager 18 and broker 12 may access, modify and confirm their trading party profiles stored on trading party profiles database 50 and the enrichment data stored on enrichment databases 56 using a data management program 88. Data management program 88 may be used to retrieve and edit stored data on trading party profiles database 50 and to supplement trading party profiles database 50 with new data (indicated as 90). Similarly, data management program 88 may be used to retrieve and edit stored data on many of enrichment databases 56 and to supplement these enrichment databases 56 with new data (indicated as 92). In addition, enrichment databases may be accessed, modified and confirmed by other authorized parties. For example, corporate actions and news database 70 may be continuously modified by a corporate news service so that database 70 contains up-to-the-minute information. Preferably, when a trading party modifies its profile on trading party profile database 50 or any of enrichment databases 56, any other parties which may be affected my such modification will be notified of the modification by data management program 88.

It should be understood from the above detailed description that all data and message flows between the system and each trading party may be asynchronous. In other words, unlike prior art systems, which rely on a sequential series of messages exchanged back and forth between the system and the trading parties, the present invention provides a system whereby the system communicates with each trading party independently of the other. Such a system greatly increases the speed at which trades are settled. It should also be understood that, while the present invention greatly aids in the settlement of securities transactions, the system does not actually perform trade settlements itself. It should also be understood that the configurability of trading parameters and message formats allows great flexibility in the interface with the trading parties. For example, one party to a trade may configure the system as described above with respect to the preferred embodiment. However, the other party may be accustomed to using a prior art system, for example, the system disclosed in U.S. Pat. No. 5,497,317, hereby incorporated by reference, and desire to receive messages as described therein. Such a user may configure its trading parameters and message formats as described above to emulate such a system.

The present invention, therefore, provides a system for facilitating the processing and settlement of securities trades which reduces the time required for settlement, which reduces the amount of information required to be input by the parties for each trade, which reduces the number of human interactions in the settlement process, which permits the parties to define settlement standards to automate and thereby speed trade settlements, which provides the parties to the settlement with value added data, which is more reliably capable of achieving settlement within less than three days of the trade date, which permits all parties to a trade to view the status of the trade in real-time, and which is capable of calculating a trade's net amount with minimum input by the trading parties.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system facilitating the processing and management of a securities trade comprising:
    a computer;
    trade execution information received by said computer, said trade execution information indicative of an executed trade by a first trading party, and comprising a first trading party identification;
    trade allocation information received by said computer, said trade allocation information indicative of an ordered trade by a second trading party, and comprising a second trading party identification;
    a database of trading party profiles accessible by said computer;

software executing on said computer for retrieving from said database a first trading party profile based on the first trading party identification and a second trading party profile based on the second trading party identification, said first trading party profile comprising an indication of enrichment options for said first trading party and said second trading party profile comprising an indication of enrichment options for said second trading party;

a plurality of enrichment databases having enrichment data stored thereon; and software executing on said computer for enriching said trade execution information with enrichment data retrieved from said plurality of enrichment databases in accordance with the enrichment options of the first trading party profile and enriching said trade allocation information with enrichment data retrieved from said plurality of enrichment databases in accordance with the enrichment options of the second trading party profile.

2. The system of claim 1 further comprising:

a set of predefined acceptable trade parameters extracted from the first trading party profile and the second trading profile; and software executing on said computer comparing said trade execution information with said trade allocation information, and determining that a match exists if said trade execution information and said trade allocation information correlate within said set of predefined acceptable trade parameters.

3. The system of claim 1 wherein the enrichment options of the first trading party profile and the enrichment options of the second trading party profile comprise indications of what enrichment data to use to enrich said trade execution information and said trade allocation information.

4. The system of claim 3 wherein the enrichment options of the first trading party profile and the enrichment options of the second trading party profile comprise indications of where the enrichment data which to use to enrich said trade execution information and said trade allocation information is located.

5. The system of claim 1 wherein the enrichment options of the first trading party profile and the enrichment options of the second trading party profile are dependent on both the first trading party identification and the second trading party identification.

6. The system of claim 1 wherein the enrichment options of the first trading party profile and the enrichment options of the second trading party profile are dependent on a type of trade being executed.

7. The system of claim 1 further comprising software executing on said computer allowing the first trading party to access, modify and confirm the enrichment options of the first trading party profile and allowing the second trading party to access, modify and confirm the enrichment options of the second trading party profile.

8. The system of claim 1 further comprising software executing on said computer allowing the first trading party and the second trading party to access, modify and confirm said enrichment databases.

9. The system of claim 1 further comprising software executing on said computer allowing parties other than the first trading party and the second trading party to access, modify and confirm said enrichment databases.

10. The system of claim 1 wherein said software executing on said computer retrieving from said database a first trading party profile based on the first trading party identification and a second trading party profile based on the second trading party identification comprises software executing on said computer retrieving from said database a first trading party profile based upon the first trading party identification and upon trade criteria and a second trading party profile based upon the second trading party identification and upon trade criteria.

11. The system of claim 2 wherein at least one of said first trading party profile and said second party profile further comprises an indication for a timer to be set and an indication of a specified time period for the timer, and further comprising software executing on said computer for generating and transmitting, if no match is found to exist within the specified time period for the timer, a notification to at least one of the first trading party and the second trading party indicating that no match has been found to exist.

12. A system facilitating the processing and management of a securities trade comprising:

a computer;

trade execution information received by said computer, said trade execution information indicative of an executed trade by a first trading party, and comprising a first trading party identification;

trade allocation information received by said computer, said trade allocation information indicative of an ordered trade by a second trading party, and comprising a second trading party identification;

a database of trading party profiles accessible by said computer;

software executing on said computer retrieving from said database a first trading party profile based upon the first trading party identification and upon trade criteria and a second trading party profile based upon the second trading party identification and upon trade criteria;

a set of predefined acceptable trade parameters extracted from the first trading party profile and the second trading profile; and software executing on said computer comparing said trade execution information with said trade allocation information, and for determining that a match exists if said trade execution information and said trade allocation information correlate within said set of predefined acceptable trade parameters.

13. The system of claim 12 wherein the trade criteria is extracted from the trade execution information.

14. The system of claim 12 wherein the trade criteria is extracted from the trade allocation information.

15. The system of claim 12 wherein the trade criteria is extracted from both the trade execution information and the trade allocation information.

16. The system of claim 12 wherein said first trading party profile comprises an indication of enrichment options said first trading party and said second trading party profile comprises an indication of enrichment options said second trading party, and further comprising:

a plurality of enrichment databases having enrichment data stored thereon; and software executing on said computer enriching said trade execution information with enrichment data retrieved from said plurality of enrichment databases in accordance with the enrichment options of the first trading party profile and enriching said trade allocation information with enrichment data retrieved from said plurality of enrichment databases in accordance with the enrichment options of the second trading party profile.

17. The system of claim 12 wherein at least one of said first trading party profile and said second party profile further comprises an indication a timer to be set and an indication of a specified time period the timer, and further comprising software executing on said computer for generating and transmitting, if no match is found to exist within the specified time period the timer, a notification to at least one of the first trading party and the second trading party indicating that no match has been found to exist.

18. A system facilitating the processing and management of a securities trade comprising:

a computer;

trade execution information received by said computer, said trade execution information indicative of an executed trade by a first trading party, and comprising a first trading party identification;

trade allocation information received by said computer, said trade allocation information indicative of an ordered trade by a second trading party, and comprising a second trading party identification;

a database of trading party profiles accessible by said computer;

software executing on said computer retrieving from said database a first trading party profile based on the first trading party identification and a second trading party profile based on the second trading party identification, at least one of said first trading party profile and said second party profile comprising an indication a timer to be set and an indication of a specified time period the timer;

a set of predefined acceptable trade parameters extracted from the first trading party profile and the second trading profile;

software executing on said computer comparing said trade execution information with said trade allocation information, and determining that a match exists if said trade execution information and said trade allocation information correlate within said set of predefined acceptable trade parameters; and software executing on said computer generating and transmitting, if no match is found to exist within the specified time period for the timer, a notification to at least one of the first trading party and the second trading party indicating that no match has been found to exist.

19. The system of claim 18 further comprising software executing on said computer allowing the first trading party to access, modify and confirm the first trading party profile and allowing the second trading party to access, modify and confirm the second trading party profile.

20. The system of claim 18 wherein said first trading party profile further comprises an indication of enrichment options said first trading party and said second trading party profile further comprises an indication of enrichment options said second trading party, and further comprising:

a plurality of enrichment databases having enrichment data stored thereon; and software executing on said computer enriching said trade execution information with enrichment data retrieved from said plurality of enrichment databases in accordance with the enrichment options of the first trading party profile and enriching said trade allocation information with enrichment data retrieved from said plurality of enrichment databases in accordance with the enrichment options of the second trading party profile.

21. The system of claim 18 wherein said software executing on said computer retrieving from said database a first trading party profile based on the first trading party identification and a second trading party profile based on the second trading party identification comprises software executing on said computer retrieving from said database a first trading party profile based upon the first trading party identification and upon trade criteria and a second trading party profile based upon the second trading party identification and upon trade criteria.

22. A system facilitating the processing and management of a securities trade comprising:

a computer;

trade execution information received by said computer, said trade execution information indicative of an executed trade by a first trading party, and comprising a first trading party identification;

trade allocation information received by said computer, said trade allocation information indicative of an ordered trade by a second trading party, and comprising a second trading party identification;

a database of trading party profiles accessible by said computer;

software executing on said computer retrieving from said database a first trading party profile based upon the first trading party identification and upon trade criteria and a second trading party profile based upon the second trading party identification and upon trade criteria, said first trading party profile comprising an indication of enrichment options said first trading party and said second trading party profile comprising an indication of enrichment options said second trading party, and at least one of said first trading party profile and said second party profile further comprising an indication for a timer to be set and an indication of a specified time period the timer;

a plurality of enrichment databases having enrichment data stored thereon;

software executing on said computer enriching said trade execution information with enrichment data retrieved from said plurality of enrichment databases in accordance with the enrichment options of the first trading party profile and enriching said trade allocation information with enrichment data retrieved from said plurality of enrichment databases in accordance with the enrichment options of the second trading party profile;

a set of predefined acceptable trade parameters extracted from the first trading party profile and the second trading profile;

software executing on said computer comparing said trade execution information with said trade allocation information, and determining that a match exists if said trade execution information and said trade allocation information correlate within said set of predefined acceptable trade parameters; and software executing on said computer generating and transmitting, if no match is found to exist within the specified time period the timer, a notification to at least one of the first trading party and the second trading party indicating that no match has been found to exist.

23. The system of claim 22 wherein the enrichment options of the first trading party profile and the enrichment options of the second trading party profile comprise indications of what enrichment data to use to enrich said trade execution information and said trade allocation information.

24. The system of claim 23 wherein the enrichment options of the first trading party profile and the enrichment options of the second trading party profile comprise indications of where the enrichment data which to use to enrich said trade execution information and said trade allocation information is located.

25. The system of claim 22 wherein the enrichment options of the first trading party profile and the enrichment options of the second trading party profile are dependent on both the first trading party identification and the second trading party identification.

26. The system of claim 22 wherein the enrichment options of the first trading party profile and the enrichment options of the second trading party profile are dependent on a type of trade being executed.

27. The system of claim 22 further comprising software executing on said computer allowing the first trading party to access, modify and confirm the enrichment options of the first trading party profile and allowing the second trading party to access, modify and confirm the enrichment options of the second trading party profile.

28. The system of claim 22 further comprising software executing on said computer allowing the first trading party and the second trading party to access, modify and confirm said enrichment databases.

29. The system of claim 22 further comprising software executing on said computer allowing parties other than the first trading party and the second trading party to access, modify and confirm said enrichment databases.

30. The system of claim 22 wherein the trade criteria is extracted from the trade execution information.

31. The system of claim 22 wherein the trade criteria is extracted from the trade allocation information.

32. The system of claim 22 wherein the trade criteria is extracted from both the trade execution information and the trade allocation information.

33. The system of claim 22 further comprising software executing on said computer allowing the first trading party to access, modify and confirm the first trading party profile and allowing the second trading party to access, modify and confirm the second trading party profile.

* * * * *